(12) United States Patent
Mathan et al.

(10) Patent No.: US 9,721,480 B2
(45) Date of Patent: Aug. 1, 2017

(54) AUGMENTED TUTORING

(75) Inventors: Santosh Mathan, Minneapolis, MN (US); Stephen D. Whitlow, St. Louis Park, MN (US); Michael C. Dorneich, St. Paul, MN (US); Patricia M. Ververs, Ellicott City, MD (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2580 days.

(21) Appl. No.: 11/350,310

(22) Filed: Feb. 8, 2006

(65) Prior Publication Data
US 2007/0184420 A1 Aug. 9, 2007

(51) Int. Cl.
*G09B 19/00* (2006.01)
(52) U.S. Cl.
CPC ................. *G09B 19/00* (2013.01)
(58) Field of Classification Search
USPC .................. 434/236, 322, 323, 350
See application file for complete search history.

(56) References Cited

U.S. PATENT DOCUMENTS

| | | | | |
|---|---|---|---|---|
| 5,267,865 | A * | 12/1993 | Lee et al. | 434/350 |
| 5,807,114 | A * | 9/1998 | Hodges et al. | 434/236 |
| 6,259,889 | B1 * | 7/2001 | LaDue | 434/308 |
| 6,293,904 | B1 * | 9/2001 | Blazey et al. | 600/26 |
| 6,457,975 | B1 * | 10/2002 | Miranda et al. | 434/236 |
| 6,626,676 | B2 * | 9/2003 | Freer | 434/236 |
| 2002/0086272 | A1 * | 7/2002 | Ho et al. | 434/236 |
| 2002/0106617 | A1 * | 8/2002 | Hersh | 434/236 |
| 2003/0118974 | A1 * | 6/2003 | Obrador | 434/236 |
| 2007/0105071 | A1 * | 5/2007 | Weatherhead | 434/81 |

FOREIGN PATENT DOCUMENTS

JP 09149894 A * 6/1997

* cited by examiner

*Primary Examiner* — Kesha Frisby
(74) *Attorney, Agent, or Firm* — Lorenz & Kopf, LLP

(57) ABSTRACT

An augmented tutoring system is provided that includes a simulation device, at least one sensor and a controller. The simulation device is adapted to provide a simulation that has an objective to accomplish by a student, wherein to achieve the objective a plurality of tasks must be correctly completed. The at least one sensor is adapted to monitor a cognitive state of the student while engaged with the simulation. The controller is adapted to process cognitive state information from the at least one sensor and to process student progress information relating to the completion of each of the tasks. The controller is further adapted to provide feedback to the student based at least in part on the processed cognitive state information and the processed task completion information.

23 Claims, 3 Drawing Sheets

AUGMENTED TUTORING

BACKGROUND

Computer based learning techniques have become increasingly popular due to their versatility and cost effectiveness. For example, computer based military simulators are used by the military to develop and maintain operational proficiency of military personnel. Evaluating how a student performed is an important factor in determining the effectiveness of the learning technique. One approach used to evaluate a students performance is with an intelligent tutoring system. In an intelligent tutoring system, the progress of a student at different steps or tasks to complete a goal is compared to the progress at the different steps of an expert in completing the goal. This allows the evaluator to determine the efficiency of the student in reaching the goal in real time and provides various times to provide feedback to the student to enhance the learning experience.

Although, the intelligent tutoring real time provides information regarding the ability of the student, it does not provide any insight into the internal states of the student such as the students working memory load or the student's attention level. This type of information is critical in determining how the student is able to learn and in determining an effective way to teach a particular student.

For the reasons stated above and for other reasons stated below which will become apparent to those skilled in the art upon reading and understanding the present specification, there is a need in the art for an effective and efficient tutoring system that takes into consideration the internal states of the student during a test.

SUMMARY OF INVENTION

The above-mentioned problems of current systems are addressed by embodiments disclosed herein and will be understood by reading and studying the following specification.

In one embodiment, a method of teaching a student is provided. The method comprises providing a simulation to a student that has an objective to accomplish, wherein to achieve the objective a plurality of tasks must be correctly completed and providing feedback to the student as the student completes the tasks based at least in part upon the performance in completing each task and a student's state while completing the task.

In another embodiment, a method of training a student is provided. The method includes providing a problem to a student, the problem having one or more definable steps between a start and a goal. Evaluating a student's progress as the student completes each of the steps of the problem. Monitoring the student's neurophysiological activities while the student completes each of the steps of the problem and providing real time feedback to the student based at least in part on the students progress in completing each step and the student's neurophysiological activities in completing each step.

In still another embodiment, an augmented tutoring system is provided. The system includes a simulation device, at least one sensor and a controller. The simulation device is adapted to provide a simulation that has an objective to accomplish by a student, wherein to achieve the objective a plurality of tasks must be correctly completed. The at least one sensor is adapted to monitor a cognitive state of the student while engaged with the simulation. The controller is adapted to process cognitive state information from the at least one sensor and to process student progress information relating to the completion of each of the tasks. The controller is further adapted to provide feedback to the student based at least in part on the processed cognitive state information and the processed task completion information.

In yet still another embodiment, a machine readable medium having instructions stored thereon for increasing the effectiveness of a learning simulation is provided. The method includes associating sensed student's state with the progress of the student with a simulation problem. Determining a plan to increase the effectiveness of the simulation based at least in part on the sensed student's state and the student progress in the simulation and directing the simulation to provide feedback to the student based on the determined plan.

In further still another embodiment, a dynamic tutoring system is provided. The tutoring system includes a means to track the progress of a student in performing tasks in accomplishing a goal, a means of determining the internal state of the student has the student performs the tasks and a means to provide feedback to the student based at least in part on the performance of the tasks and the state of the student when performing the task.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments disclosed herein provide a method of training a student in real time using the assessment of a student's cognitive state during tasks of the test to help evaluate and provide feedback to the student. In particular, embodiments combine computer based cognitive tutoring with non-invasive neurophysiological sensing to dynamically guide a student towards effectively learning a subject. Dynamically guiding the student is accomplished with feedback based upon both an assessment of overt problem solving actions and parameters such as working memory load, attention level and cognitive arousal that have an impact on learning outcomes. In other embodiments, physical characteristics of the student are monitored and the feedback to the student is based in part on the monitored physical characteristics.

Figure 1:
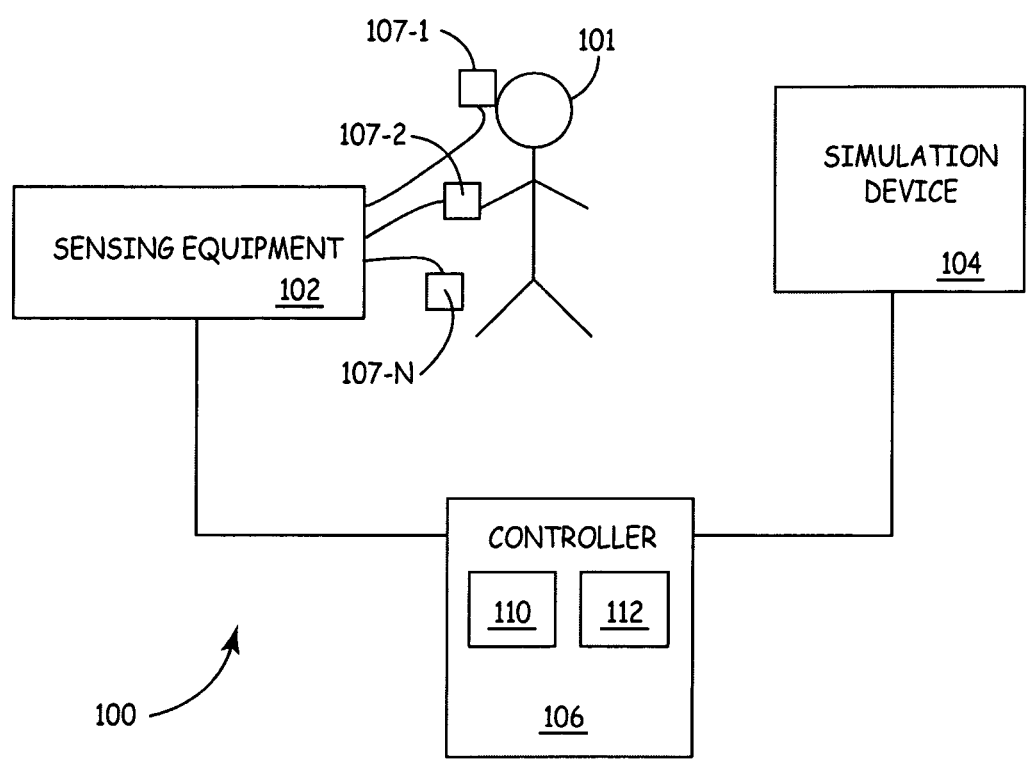
FIG. 1 is a block diagram of an augmented tutoring system of one embodiment of the present invention.

Referring to FIG. 1, a block diagram of an augmented tutoring system 100 of the present invention is provided. As illustrated, in this embodiment, the tutoring system 100 includes a simulator device 104, sensing equipment 101 and a controller 106. The simulator device 104 provides an interface with the student 101 (or learner). For example, the simulator 104 may simulate a military situation upon which the student is prompted to resolve various tasks in accomplishing an objective. The sensing equipment 102 is coupled to one or more sensors 107-1 through 107-N. The sensors 107-1 through 107-N maybe sensors that sense neurophysiological activities, such as the cognitive state of the student. For example, sensors 107-1 through 107-N maybe one of electroencephalogram (EEG) sensors, electrocardiogram (ECG/EKG) sensors, skin conductivity sensors or pupilmetry sensors. Further in one embodiment 107-1 represents functional near infrared (fNIR) monitoring device. Moreover, in other embodiments one or more of the sensors are sensors to sense physical characteristics of the student such as body movements or body positions. The sensing equipment 102 processes signals sensed by the sensors 107-1 through 107-N and provides the signals to the controller 106.

The controller 106 processes the signals sent the sensing equipment 102. The controller is also in communication with the simulation device 104. In embodiments disclosed herein the controller 106 tracks the progress of the student during the simulation provided by the simulation device 104. The controller 106 further associates signals sent by the sensing equipment 102 with the progress of the student in the simulation. That is, the information regarding the student (i.e. cognitive state or physical characteristics) at a particular time is associated with what was occurring with the simulation at that particular time. The controller 106 includes a processor 110 to process information received and to provide direction to the simulation device 104. The controller 106 further includes a memory to store results that can be accessed after the simulation has been completed for further analysis. Although, the controller 106, sensing equipment 102 and simulation device 104 are illustrated as being separate from each other, it will be understood that they may be housed in one or more units. Accordingly, embodiments of present invention are not limited in the number of housings used to implement the augmented tutoring systems of the present invention.

Figure 2:
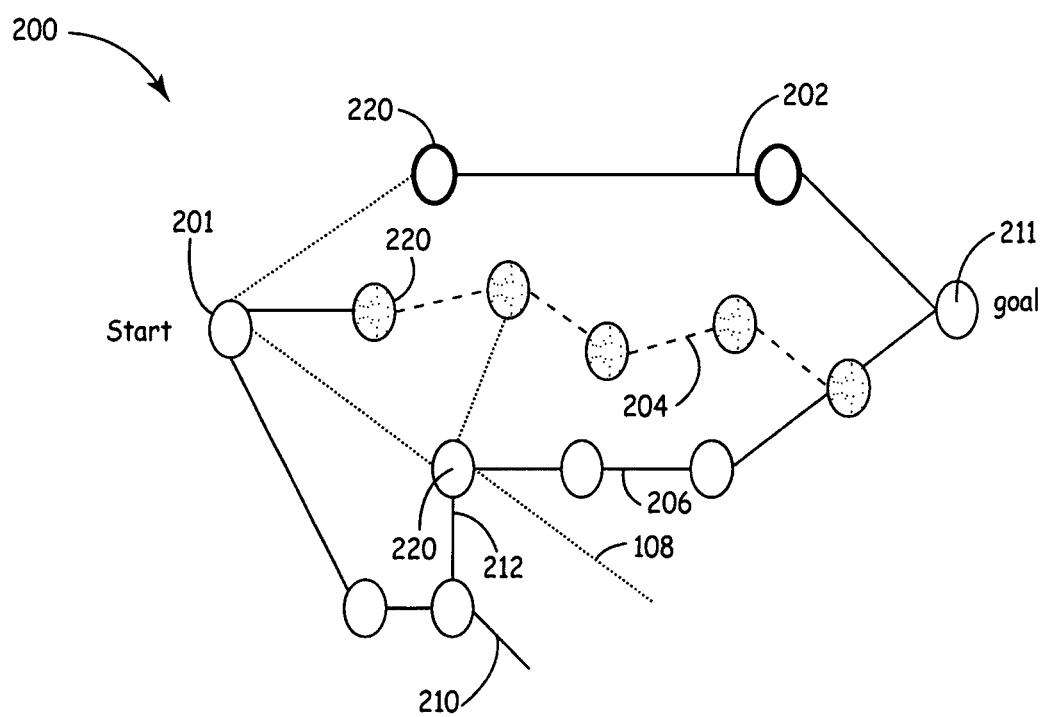
FIG. 2 is a problem solving diagram.

FIG. 2 is a problem solving diagram 200 associated with a simulation that can be combined with information regarding a students state to provide an augmented tutoring scenario of one embodiment. In particular, FIG. 2, illustrates tasks completion points 220 that make a path to a goal 211. As illustrated, starting from the start 201, many paths 202, 204, 206, 208 and 210 can be taken. Only certain paths 202, 204 and 206, however, reach the goal 211. Moreover, the goal of the simulation is for the student to take the optimal path 202 which is the most efficient path to the goal 211. In embodiments of the present, not only is the student's progress in completing the tasks 220 monitored but also the student's cognitive state (and in some embodiments the student's physical characteristics) as the student completes a task. The information regarding the student's progress in the simulation and the student's cognitive state is combined to provide the student with guidance as the student completes the exercise.

As discussed above, an example of a student's state that could be monitored is a student's cognitive state with and EEG sensor. A sensed high cognitive load could mean that a task might not have been learned. In this scenario, the student may be asked to repeat a task. Moreover, a high cognitive load combined with the student taking the wrong path could indicate the student is having a hard time understanding certain concepts and the simulation could be directed to address the issue. On the other hand, a low cognitive state could mean a low attention level. Such lapses in attention over the course of reading text and watching video expositions of the simulation can have a negative impact on the skill acquisition process. Moreover, students may miss critical information that could be of importance in subsequent task problem solving efforts. In embodiments of the present mitigation strategies are invoked to minimize the negative impact of low attention levels. For example, the system could intervene and step the student through the material with the use of interactive prompts. In one embodiment, the prompts would present the student with questions having multiple choice answers so their progress in learning the subject matter can be tracked. In addition, in one embodiment, the system indexes text or video segments where the student's attention level was low and prompts the students to revisit those segments later in time.

Another example of a student's state to be monitored is a student's cognitive arousal which can be tracked by assessing heart rate variability. Heart rate variability provides insight into sympathetic and parasympathetic components of the central nervous system. Monitoring a student's cognitive arousal can be important in military simulations to determine how a student will react to a given situation. In embodiments of the present invention, the system uses the monitored student's cognitive arousal to guide the student to a desired outcome. For example, the desired outcome may be a desired cognitive arousal when faced with similar situations in the future.

Figure 3:
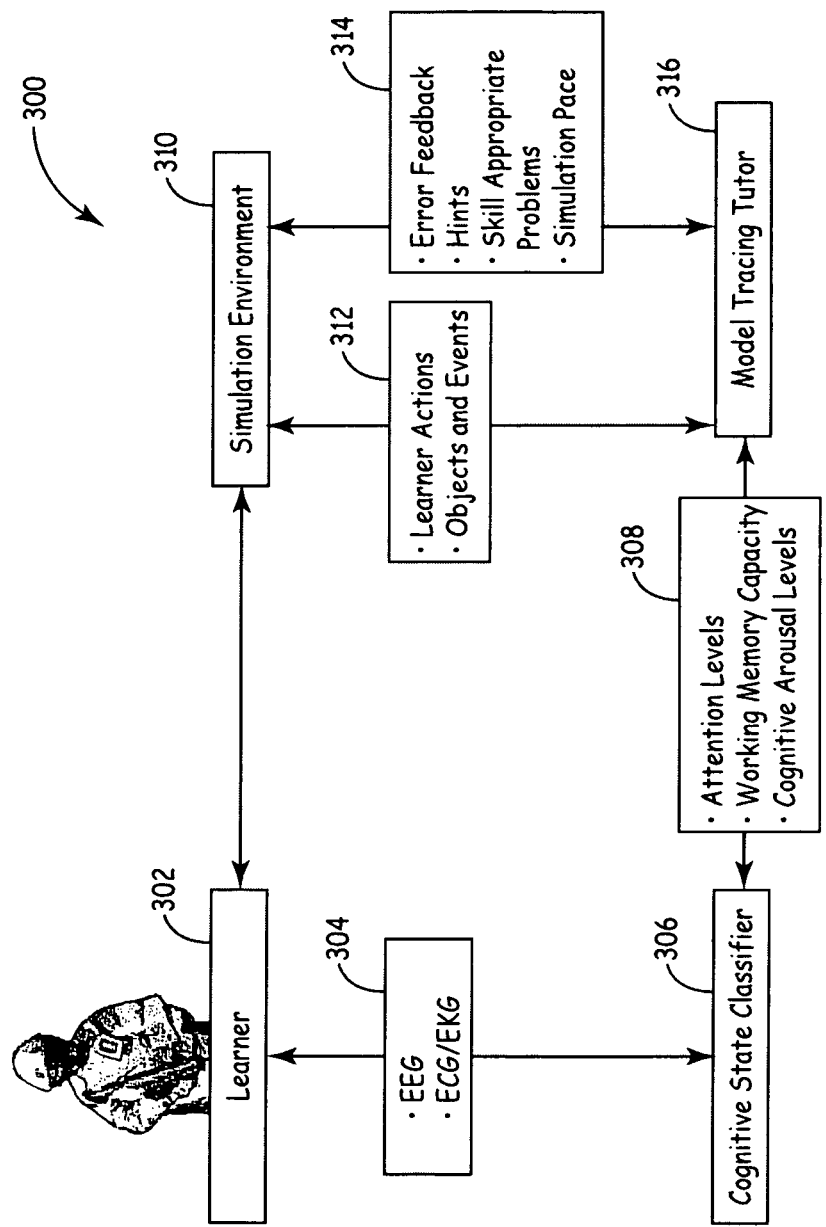
FIG. 3 is a flow diagram illustrating one method of an augmented tutoring system of one embodiment of the present invention.

Referring to FIG. 3 a flow diagram 300 illustrating an augmented tutor system 300 of one embodiment the present invention is illustrated. As illustrated, the learner 302 (or student) interfaces with a simulation environment 310. Sensors are used to monitor the student's states at 304. Examples of sensors illustrated in the flow diagram of FIG. 3 are EEG and ECG/EKG sensors. It will be understood that these are only non-limiting examples of the type of sensors that could be used. Moreover, it will be understood that other types of tools such as fNIR monitoring can be used to determine a cognitive state of the learner. A cognitive state classifier is used to process the signals from the sensors at 306. The cognitive state classifier provides a similar function as the sensing equipment of FIG. 1. Examples of some of the classified cognitive states detected by the sensors are illustrated at 308. As illustrated, the examples include attention levels, working memory capacity and cognitive arousal levels. A model tracing tutor receives the classified cognitive states 308 as well as the learner's actions and objects and events 312 in real time from the simulation environment at 316. The model tracing tutor at 316 processes the cognitive states associated with the learner's actions and the objects and events of the simulation. As illustrated, the model tracing tutor at 316 then directs the simulation environment 104 to proceed based on the processed information. Examples of directions on how the simulation environment is to proceed are illustrated at 314. As illustrated the examples include error feedback, hints, skill appropriate problems and simulation pace.

The methods and techniques described herein are implemented by an augmented tutoring system. Embodiments of devices that make up the augmented tutoring system may be implemented in digital electronic circuitry, or with a programmable processor (for example, a special-purpose processor or a general-purpose process such as a computer firmware, software, or in combinations of them). Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of teaching a student, the method comprising:
    attaching a plurality of sensors to the student to obtain the student's cognitive state;
    providing a temporally continuous simulation to a student that has an objective to accomplish, wherein to achieve the objective a plurality of definable tasks must be correctly completed;
    via a processor, tracking and recording progress of the student through the temporally continuous simulation;
    associating an output of the plurality of sensors with the progress of the student during a term of the temporally continuous simulation;
    providing direction to the temporally continuous simulation during the term of the temporally continuous simulation based at least in part on the output from the plurality of sensors;
    indexing areas in the temporally continuous simulation based on signals indicating the student's cognitive state for later review; and
    providing feedback to the student as the student completes the plurality of tasks based at least in part upon performance in completing each task and a student's cognitive state while completing the task.

2. The method of claim 1, wherein the simulation comprises a series of completion points defining a path to the objective.

3. The method of claim 2, wherein the simulation further comprises alternative completion points defining a false path to the objective.

4. The method of claim 3, wherein successfully reaching the objective is defined as completing the completion points constituting an optimal path.

5. The method of claim 1, further comprising:
    monitoring the student's cognitive state.

6. The method of claim 5, wherein monitoring the student's cognitive state further comprises:
    monitoring at least one of the student's working memory load, the student's attention level and the student's cognitive arousal.

7. The method of claim 1, wherein the student's state also includes the student's physical characteristics.

8. The method of claim 7, wherein the student's physical characteristics are at least one of physical movement and body position.

9. A method of training a student, the method comprising:
    attaching a plurality of sensors to the student;
    providing a temporally continuous simulation having problem to solve by a student, the problem having one or more definable steps between a start and a goal;
    evaluating a students progress as the student completes each of the steps of the problem;
    monitoring the student's neurophysiological activities via the plurality of sensors while the student completes each of the steps of the problem;
    indexing areas in the temporally continuous simulation based on the student's cognitive state for later review; and
    providing real time feedback to the student based at least in part on the students progress in completing each step of the temporally continuous simulation and the student's neurophysiological activities in completing each step.

10. The method of claim 9, further comprising:
    monitoring the student's physical movements while completing each step and providing the real time feedback to the student based at least in part on the monitored physical movements.

11. The method of claim 9, further comprising:
    monitoring a position of the student's body while completing each step and providing real time feedback to the student based at least in part on the monitored position of the body.

12. The method of claim 9, wherein monitoring the student's neurophysiological activities further comprises at least one of monitoring the student's working memory load, monitoring the student's attention level and monitoring the student's cognitive arousal.

13. The method of claim 9, further comprising:
    modifying the problem based at least in part on the monitored student's neurophysiological activities.

14. An augmented tutoring system, the system comprising:
    a simulation device adapted to provide a temporally continuous simulation that has an objective to accomplish by a student, wherein to achieve the objective a plurality of definable tasks must be correctly completed;
    at least one sensor adapted to monitor a cognitive state of the student while engaged with the temporally continuous simulation; and
    a controller adapted to process cognitive state information from the at least one sensor, to index areas in the temporally continuous simulation based on the student's cognitive state information for later review, and to process student progress information relating to the completion of each of the tasks, the controller further adapted to provide feedback to the student based at least in part on the processed cognitive state information and the processed task completion information.

15. The system of claim 14, wherein the controller further comprises:
a memory adapted to store sensed data and marked temporally continuous simulation data.

16. The system of claim 14, further comprising:
at least one physical characteristic sensor adapted to sense at least one of physical movements and physical body positions of the student, the controller adapted to process the at least one of physical movements and physical body positions of the student information and provide feedback to the student based in part on the physical movements and physical body positions of the student.

17. The system of claim 14, further comprising:
sensing equipment adapted to interface signals between the at least one sensor and the controller.

18. A machine readable storage medium having instructions stored thereon that when executed by a computing device increase effectiveness of a learning simulation, the instructions comprising:
from a plurality of sensors attached to a student, receiving measurements sensing the student's state;
associating the sensed student's state with a progression of the student within a temporally continuous simulation problem;
altering the learning simulation to increase the effectiveness of the temporally continuous simulation problem based at least in part on the sensed student's state and the student progress in the temporally continuous simulation problem;
indexing areas in the temporally continuous simulation based on the student's cognitive state for later review;
storing the marked temporally continuous simulation for later review; and
directing the temporally continuous simulation to provide feedback to the student based on the determined plan.

19. The machine readable medium of claim 18, wherein the instructions stored thereon further comprise:
processing neurophysiological data to determine the student's state.

20. The machine readable medium of claim 18, wherein the instructions stored thereon further comprise:
processing physical movements and physical body positions to determine the student's state.

21. A dynamic tutoring system simulation, the tutoring system comprising:
a means to track progress of a student via a computer in performing definable tasks provided by a temporally continuous simulation in accomplishing a goal of the temporally continuous simulation;
a means of measuring an internal neurophysiological state of the student as the student performs the tasks provided by the temporally continuous simulation;
a means of indexing areas in the temporally continuous simulation indicating at least the student's neurophysiological state for later review;
a means for increasing the effectiveness of the simulation based at least in part student's neurophysiological state; and
a means to provide feedback to the student based at least in part on the performance of the tasks and the state of the student when performing the tasks.

22. The tutoring system of claim 21, wherein the means for measuring the internal neurophysiological state of a student further comprises:
a means to monitor a cognitive state of the student as the student is performing the tasks.

23. The tutoring system of claim 21, wherein the means for determining the internal neurophysiological state of a student further comprises:
a means to track physical characteristics of the student.

* * * * *